June 12, 1962 H. W. FULLER ET AL 3,039,102

ALIGNMENT TECHNIQUES FOR RECORDING HEADS ASSEMBLY

Filed Jan. 24, 1957 2 Sheets-Sheet 1

INVENTORS
HARRISON W. FULLER
SIDNEY P. WOODSUM
WILLIAM T. DAROU JR.
CARL W. LEDIN

BY Fred Jacob
ATTORNEY

ALIGNMENT TECHNIQUES FOR RECORDING HEADS ASSEMBLY

Filed Jan. 24, 1957 2 Sheets-Sheet 2

INVENTORS
HARRISON W. FULLER
SIDNEY P. WOODSUM
WILLIAM T. DAROU JR.
CARL W. LEDIN

BY Fred Jacob
ATTORNEY

3,039,102
ALIGNMENT TECHNIQUES FOR RECORDING HEADS ASSEMBLY

Harrison W. Fuller, Needham Heights, Sidney P. Woodsum, Groton, and William T. Darou, Jr., and Carl W. Ledin, Westwood, Mass., assignors, by mesne assignments, to Laboratory for Electronics, Inc., Boston, Mass., a corporation of Delaware Filed Jan. 24, 1957, Ser. No. 636,013
3 Claims. (Cl. 346—74)

The present invention relates in general to techniques for aligning magnetic recording/readout heads relative to their respective magnetic tracks on a recording surface. The term "recording/readout," as used herein, relates to a process whereby data is stored in, or read out from a magnetic recording surface, the data being transferred to and from the recording surface by means of a magnetic head. If, during the time when data is being recorded, relative lateral motion exists between the magnetic head and the recording surface, e.g. between the head and a magnetic drum surface, a magnetic track which contains the stored information is defined on the recording surface. Data storage systems which operate in this manner and their associated magnetic head assemblies are disclosed in detail in the following co-pending applications:

Harrison W. Fuller et al., "Magnetic Data Storage Techniques," Serial No. 564,229 filed February 8, 1956;

Harrison W. Fuller et al., "Magnetic Head Assemblies," Serial No. 566,261 filed February 17, 1956, now Patent No. 2,913,536;

William T. Darou, Jr., et al., "Magnetic Head Assemblies," Serial No. 587,231 filed May 25, 1956, now Patent No. 2,961,494.

Where the magnetic recording surface contains a large number of magnetic tracks, it is important that the magnetic head associated with each track remains precisely aligned therewith. Heretofore, the alignment of the magnetic heads with their respective associated tracks, particularly in high density magnetic drum storage systems of the type referred to above, presented a major problem which consumed a large portion of the installation time of the apparatus. The magnitude of the problem may be appreciated when it is considered that the width of the magnetic pole pieces of the magnetic head member and the width of the magnetic track defined by each of them is no greater than 30 mils. Misalignment of the order of 15 mils or less may result in the loss of data and hence, may impair the effectiveness of the storage system. Additionally, in apparatus of the type referred to above, it has generally been necessary to defer the magnetic head alignment until after the entire data storage apparatus has been installed and set up. Inasmuch as the apparatus cannot be used during the alignment procedure, it is preferable to take care of the latter without tying up the equipment. This is true not only during the initial installation of the apparatus, but also during its operation when it is often necessary to replace one or more of the magnetic head members.

Accordingly, it is an object of this invention to provide techniques for precisely aligning magnetic head members with their associated magnetic tracks on a recording surface which can be carried out quickly and economically.

It is another object of this invention to provide techniques for precisely aligning magnetic head members which may be carried out independently of the associated data storage apparatus.

It is a further object of this invention to provide alignment techniques which permit the ready interchange of the magnetic head members after the latter have been installed without requiring additional alignment.

In accordance with the principles of the present invention, each magnetic head member is associated with a head mount. Each group of head mounts is arranged in a column and is thus mounted on a common head mount bar. In normal recording/readout usage, the bar is mounted on the housing of the recording apparatus so that the heads are opposite their corresponding tracks on the recording surface. For purposes of alignment, the bar is mounted on a carriage which has predetermined periodic stops along its track. An alignment standard moves along with the carriage and is used for comparison against the respective head mounts as the latter arrive at a comparison and alignment station. The head mount bar further comprises dowel pins which are adapted to mate with precision located bores in the carriage, as well as with identical bores located in the drum housing of the storage apparatus. Accordingly, the alignment of each head mount relative to the standard while the bar is located on the carriage, is fully determinant of the head mount alignment relative to the magnetic tracks after the head mount bar is mounted on the drum housing. Alternatively, means may be provided for aligning the head mount bar on the housing. Inasmuch as the magnetic head members are self-aligning relative to their head mounts, they may be mounted on the latter without further alignment with their corresponding magnetic tracks.

These and other novel features of the invention together with further objects and advantages thereof will become more apparent from the following detailed specification with reference to the accompanying drawings, in which.

Figure 1:
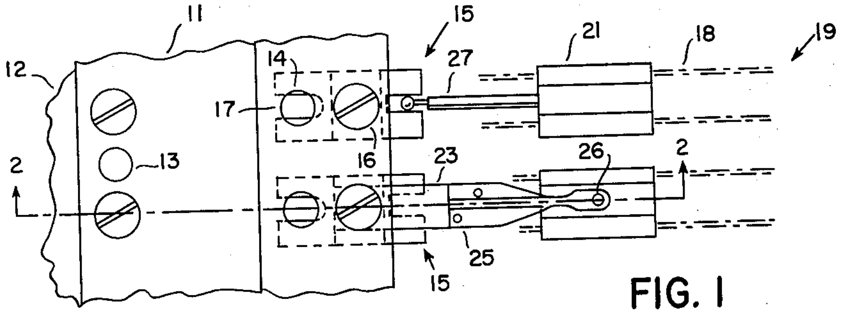
FIG. 1 illustrates the mounted magnetic head assemblies, with the heads in recording/readout position with the magnetic surface below.

With reference now to the drawings and particularly FIG. 1 thereof, two magnetic head assemblies are shown in recording/readout relationship to magnetic tracks 18 on storage surface 19 located below. The head mounts 15 of the magnetic head assemblies are mounted on head mount bar 11, the latter in turn being affixed to drum housing 12. The head mount bar 11 is precision aligned with the drum housing by means of dowel pins 13 and mating holes in the housing. The head mount bar further comprises holes 14 each being superimposed over a slot 17 in the head mount. Head mount 15 is attached to the head mount bar by means of bolts 16. Each head mount supports a dual magnetic head member 21, each of said dual heads defining two of the aforesaid magnetic tracks 18 on the recording surface.

Figure 2:
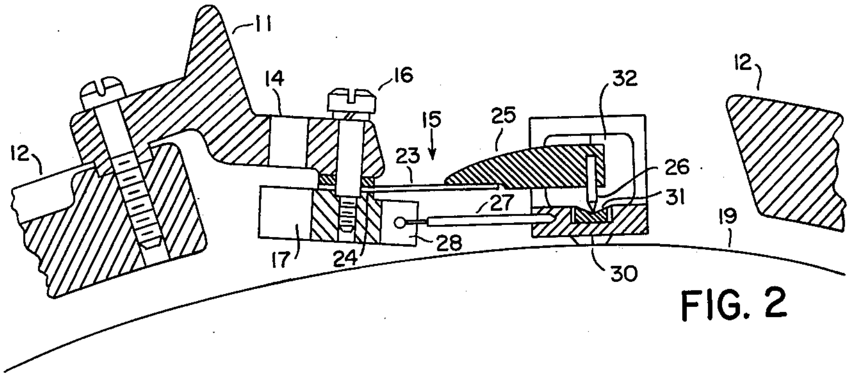
FIG. 2 is a cross sectional view of the apparatus of FIG. 1 taken along line 2—2.

FIG. 2 is a cross-sectional view of the apparatus of FIG. 1 taken along line 2—2. The head mount further comprises a flat leaf spring 23 which has one end clamped between the head mount bar and a portion 24 of the head mount. The free end of the leaf spring supports a force arm unit 25. A pivot pin 26 is carried by the force arm unit and links pivotally with a conical pivot bearing 31 carried by the dual magnetic head member 21. A stabilizing bar 27 is attached to each dual head member by one of its ends, its free end riding in slot 28 of the head mount. While motion about the axis of the pivot pin is constrained by the aforesaid stabilizing bar and slot, the head member is otherwise self aligning as set forth in detail in the above mentioned co-pending application Serial No. 564,229. Each magnetic head comprises a pair of pole pieces 32 positioned in mirror image relationship, but having a gap 30 therebetween. The fringing magnetic flux across the gap magnetizes a portion of the recording surface so as to define a magnetic track thereon when relative lateral motion exists between the surface and the head.

Figure 3:
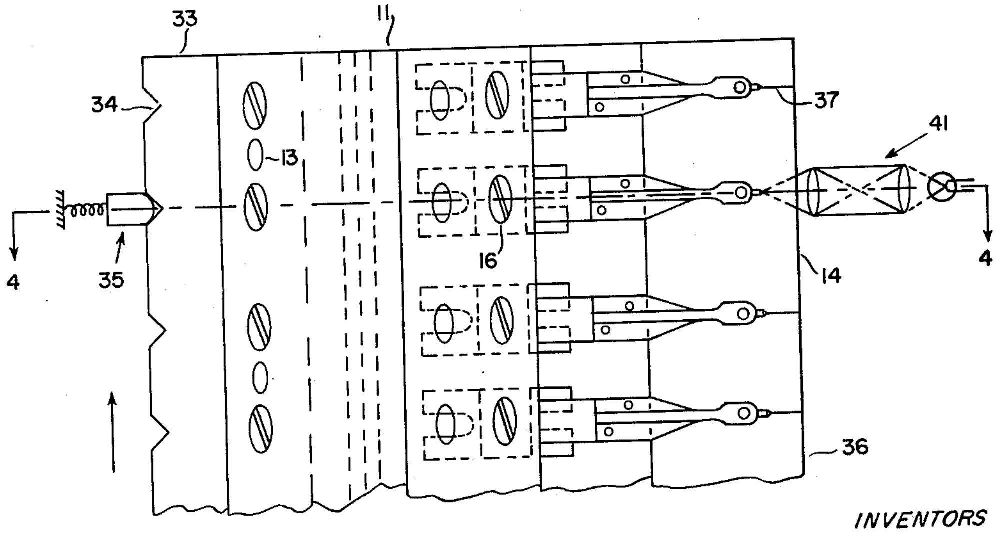
FIG. 3 illustrates the alignment of the head mounts with a standard.

FIG. 3 shows head mount bar 11 mounted on a carriage 33. Precision alignment between the head mount bar and the carriage is taken care of by means of the aforesaid dowel pins 13 and precision-located mating holes in the carriage. The carriage contains periodic slots 34, which are located at the precise spacing of the head mounts from each other. A detent spring arrangement 35 cooperates with slots 34 to provide the required stops as carriage 33 moves along its tracks in the direction indicated by the arrow. A standard 36 is attached to the carriage so as to move together with the latter. The standard may comprise any suitable device against which the pivot points of pivot pins 26 can be aligned. In the instant embodiment, standard 36 consists of a bar having lines 37 periodically inscribed thereon. The lines are spaced from each other at the precise intervals of the head mounts along the head mount bar. Optical means are used herein for aligning the points of the aforesaid pivot pins with the lines, although other means, e.g. electrical, mechanical contact etc., are equally suitable. A station 41 is provided opposite one of slots 34 where the actual comparison of the pivot pin with the inscribed line and the subsequent alignment therewith takes place.

Figure 4:
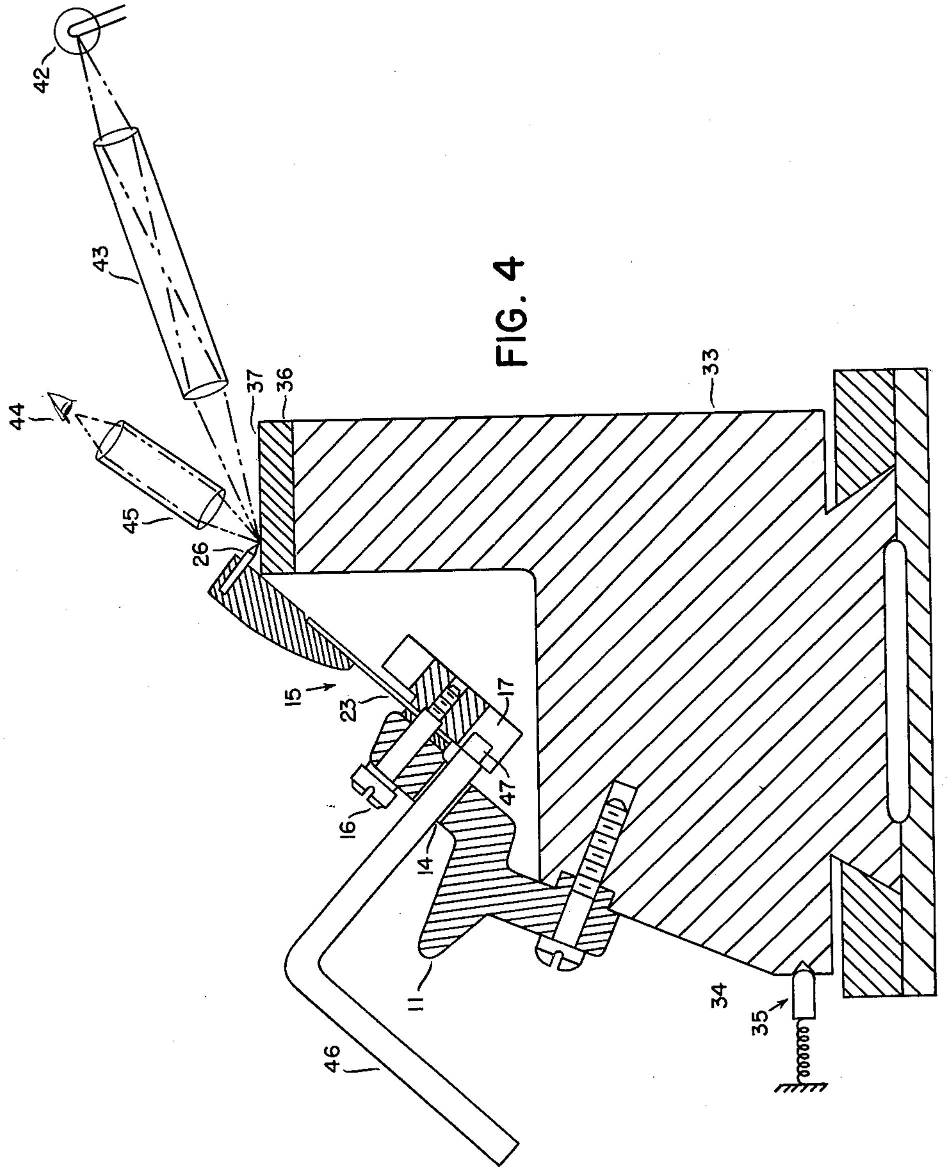
FIG. 4 is a cross-sectional view of the apparatus of FIG. 3 taken along line 4—4, with the alignment tool in place.

FIG. 4 is a cross-sectional view taken along lines 4—4 of the apparatus of FIG. 3 which illustrates the alignment of a head mount upon its arrival at station 41. The light from a source 42 is focused onto line 37 by means of an optical arrangement 43. An observer 44 can view the alignment procedure through a suitable optical device 45, preferably one having some power of magnification. Since the dual magnetic head member is self aligning relative to the head mount, only pivot pin 26, which supports the head member in operation, has to be aligned with the inscribed line of the standard. An alignment tool 46 which has an eccentric end 47, is inserted into bore 14 of the head mount bar, bolt 16 having been loosened previously. The eccentric end engages slot 17 of the head mount. Rotary motion of tool 46 about its own axis displaces the head mount relative to the head mount bar. This action is continued until alignment of the pivot point of pin 26 with inscribed line 37 has been obtained, as viewed by observer 44, whereupon bolt 16 is tightened. The other head mounts are successively moved to station 41 and are aligned in the same manner. It should be noted that the points of the pivot pins now bear a fixed positional relationship relative to the head mount bar. Since dowel pins 13 of the latter mate precisely with corresponding holes on the carriage as well as on the drum housing, the pivot pins of respective head mounts will be precisely positioned when the head mount bar is subsequently mounted on the drum housing. In view of the fact that the dual head members are self aligning relative to the head mounts, no further alignment is necessary to line up the heads with their corresponding magnetic tracks. A simple and economical technique has thus been provided for aligning magnetic heads relative to their associated respective magnetic tracks on a recording surface. It will be understood that the arrangement shown herein permits the free interchange of magnetic head members without further alignment, provided the head mounts used remain the same.

As previously pointed out, the head mount bar need not have the pre-positioning arrangement provided by the dowel pins, but means may be provided for aligning the bar relative to the housing. It should be further noted that the invention disclosed herein is not limited to self-aligning magnetic head members. In the case of head mounts carrying fixed head members, the apparatus herein described may readily be adapted to provide for the alignment of the head members themselves relative to an alignment standard.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In a data storage system comprising a magnetic drum having magnetic data tracks on its recording surface, said drum being movably arranged relative to a drum housing surrounding it in part, at least one bank of head mounts removably located on said drum housing in a predetermined positional relationship relative to said data tracks, said bank comprising a common head mount bar having precision-located dowel pins adapted to mate with corresponding bores in said drum housing to determine said positional relationship, a column of head mounts each comprising a first rigid portion alignably attached to said head mount bar, a second rigid portion including a pivot pin adapted to pivotably engage an operatively self-aligning magnetic head member, a leaf spring connecting said first and second rigid portions, said leaf spring urging said pivot pin toward the drum surface when said bank of head mounts is located on said drum housing; whereby said bank may be removed from said drum housing for aligning said head mounts against a track alignment standard having said predetermined positional relationship with reference to said precision-located dowel pins.

2. In a data storage system comprising a storage medium having magnetic data tracks thereon, said storage medium being movably arranged relative to an associated fixed housing structure, said housing structure having first precision locating means, at least one bank of head mounts removably located on said housing structure in a predetermined positional relationship relative to said data tracks, said bank comprising a common head mount bar having second precision locating means adapted to cooperate with said first precision locating means to determine said positional relationship, a column of head mounts each comprising a rigid portion alignably and independently attached to said head mount bar, spring means extending from said rigid portion and adapted to pivotably engage an operatively self-aligning magnetic head member and to urge it toward the storage medium when said bank of head mounts is located on said housing; whereby said bank may be removed from said housing structure for aligning said head mounts against a track alignment standard having the same predetermined positional relationship to said head mounts as do said data tracks.

3. In a data storage system comprising a storage medium having magnetic data tracks thereon, said storage medium being movably arranged relative to an associated fixed housing structure, said housing structure having first precision locating means, at least one bank of head mounts removably located on said housing structure in a predetermined positional relationship relative to said data tracks, said bank comprising a common head mount bar having second precision locating means adapted to cooperate with said first precision locating means to determine said positional relationship, a column of head mounts each comprising a first rigid portion alignably and independently attached to said head mount bar, a second rigid portion including a pivot pin adapted to pivotably engage an operatively self-aligning magnetic head member, a leaf spring connecting said first and second rigid portions, said leaf spring urging said pivot pin toward the storage medium when said bank of head mounts is located on said housing; whereby said bank may be removed from said housing structure for aligning said head mounts against a track alignment standard having the same predetermined positional relationship to said bank of head mounts as do said data tracks.

(References on following page)

References Cited in the file of this patent

UNITED STATES PATENTS

| | | |
|---|---|---|
| 2,143,241 | Hallenbeck | Jan. 10, 1939 |
| 2,237,515 | Williams | Apr. 8, 1941 |
| 2,252,535 | West et al. | Aug. 12, 1941 |
| 2,632,957 | Gardner | Mar. 3, 1953 |
| 2,644,856 | Pettus | July 7, 1953 |
| 2,733,425 | Williams et al. | Jan. 31, 1956 |
| 2,802,201 | Casagrande | Aug. 6, 1957 |
| 2,880,280 | Gernert et al. | Mar. 31, 1959 |
| 2,961,494 | Darou et al. | Nov. 22, 1960 |